(12) United States Patent
Leitgeb et al.

(10) Patent No.: US 9,863,525 B2
(45) Date of Patent: Jan. 9, 2018

(54) TRANSFER GEAR

(71) Applicant: Magna Powertrain AG & Co KG, Lannach (AT)

(72) Inventors: Stefan Leitgeb, Kainbach bei Graz (AT); Johann Willberger, Graz (AT)

(73) Assignee: MAGNA POWERTRAIN AG & CO KG, Lannach (AT)

( * ) Notice: Subject to any disclaimer, the term of this patent is extended or adjusted under 35 U.S.C. 154(b) by 237 days.

(21) Appl. No.: 14/718,179

(22) Filed: May 21, 2015

(65) Prior Publication Data
US 2015/0337948 A1    Nov. 26, 2015

(30) Foreign Application Priority Data

May 21, 2014 (DE) .......... 10 2014 209 700
May 8, 2015 (DE) .......... 10 2015 208 630

(51) Int. Cl.
*F16H 37/06* (2006.01)
*F16H 57/04* (2010.01)
(Continued)

(52) U.S. Cl.
CPC ....... *F16H 57/0457* (2013.01); *B60K 17/344* (2013.01); *F16H 3/20* (2013.01); *F16H 7/06* (2013.01); *F16H 57/04* (2013.01); *F16H 57/045* (2013.01); *F16H 57/0423* (2013.01); *F16H 57/0424* (2013.01); *F16H 57/0471* (2013.01); *F16H 57/0486* (2013.01);
(Continued)

(58) Field of Classification Search
CPC .......... F16H 37/021; F16H 2037/026

USPC .................................................. 74/665 GE
See application file for complete search history.

(56) References Cited

U.S. PATENT DOCUMENTS 5,275,252 A * 1/1994 Sperduti ............ B60K 17/3465
                                                                180/197
5,330,030 A * 7/1994 Eastman .............. B60K 17/344
                                                                180/233
(Continued)

FOREIGN PATENT DOCUMENTS

DE    3705064 A1    5/1988
DE    3942411 A1    6/1992
(Continued)

OTHER PUBLICATIONS

Search Results dated Sep. 23, 2016 in corresponding Korean patent application Serial No. 10-2015-0071200.

*Primary Examiner* — Ha D Ho
(74) *Attorney, Agent, or Firm* — Dickinson Wright PLLC

(57) ABSTRACT

A clutch-controlled transfer gear having a drive shaft which is mounted so as to be rotatable by way of at least one drive shaft bearing, a primary shaft which is mounted so as to be rotatable by way of at least one primary shaft bearing, a secondary shaft which is arranged with an axial offset with respect to the drive shaft and which is mounted so as to be rotatable by way of at least one secondary shaft bearing, a transfer mechanism which is arranged between secondary shaft and drive shaft and bridges the axial offset thereof, and a clutch which is arranged between the drive shaft and an offset gear, by means of which clutch the secondary shaft is, for the operation thereof, coupled to the drive shaft and, for the deactivation thereof, decoupled from the drive shaft, as required.

21 Claims, 10 Drawing Sheets

(51) Int. Cl.
  *B60K 17/344* (2006.01)
  *F16H 3/20* (2006.01)
  *F16H 7/06* (2006.01)
  *F16H 57/05* (2006.01)

(52) U.S. Cl.
  CPC ........ *F16H 57/05* (2013.01); *Y10T 74/19079* (2015.01); *Y10T 74/19102* (2015.01)

(56) References Cited

U.S. PATENT DOCUMENTS

| | | | |
|---|---|---|---|
| 5,704,863 A * | 1/1998 | Zalewski | B60K 17/344 180/247 |
| 7,753,173 B2 | 7/2010 | Gratzer et al. | |
| 7,841,449 B2 * | 11/2010 | Nakamura | F16H 57/0447 184/6.12 |
| 7,984,791 B2 * | 7/2011 | Taguchi | F16H 57/0483 184/11.1 |
| 8,650,980 B2 | 2/2014 | Lafer et al. | |
| 8,672,094 B2 | 3/2014 | Quehenberger | |
| 8,845,473 B2 | 9/2014 | Nett et al. | |
| 9,046,166 B2 | 6/2015 | Neumeister | |
| 2008/0308354 A1 | 12/2008 | Gratzer et al. | |
| 2014/0054114 A1 | 2/2014 | Isomura et al. | |
| 2014/0094333 A1 | 4/2014 | Ebner et al. | |
| 2015/0060228 A1 | 3/2015 | Francis et al. | |

FOREIGN PATENT DOCUMENTS

| | | |
|---|---|---|
| DE | 102004056841 A1 | 1/2006 |
| DE | 102006034153 A1 | 1/2008 |
| DE | 102007057984 A1 | 6/2009 |
| DE | 102008058278 A1 | 5/2010 |
| DE | 102013204921 A1 | 8/2014 |
| EP | 1582777 A2 | 10/2005 |
| JP | 61054593 U | 4/1986 |
| JP | 61112252 U | 10/1986 |
| JP | H0914406 A | 1/1997 |
| JP | H09100900 A | 4/1997 |
| JP | H10122340 A | 5/1998 |
| KR | 20110031416 A | 3/2011 |
| WO | 2005115790 A1 | 12/2005 |

* cited by examiner

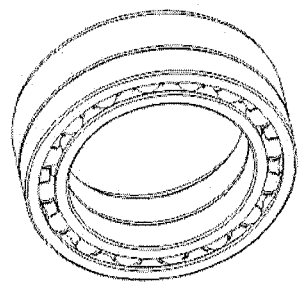
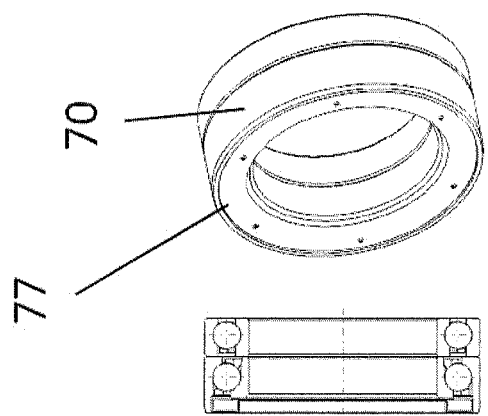
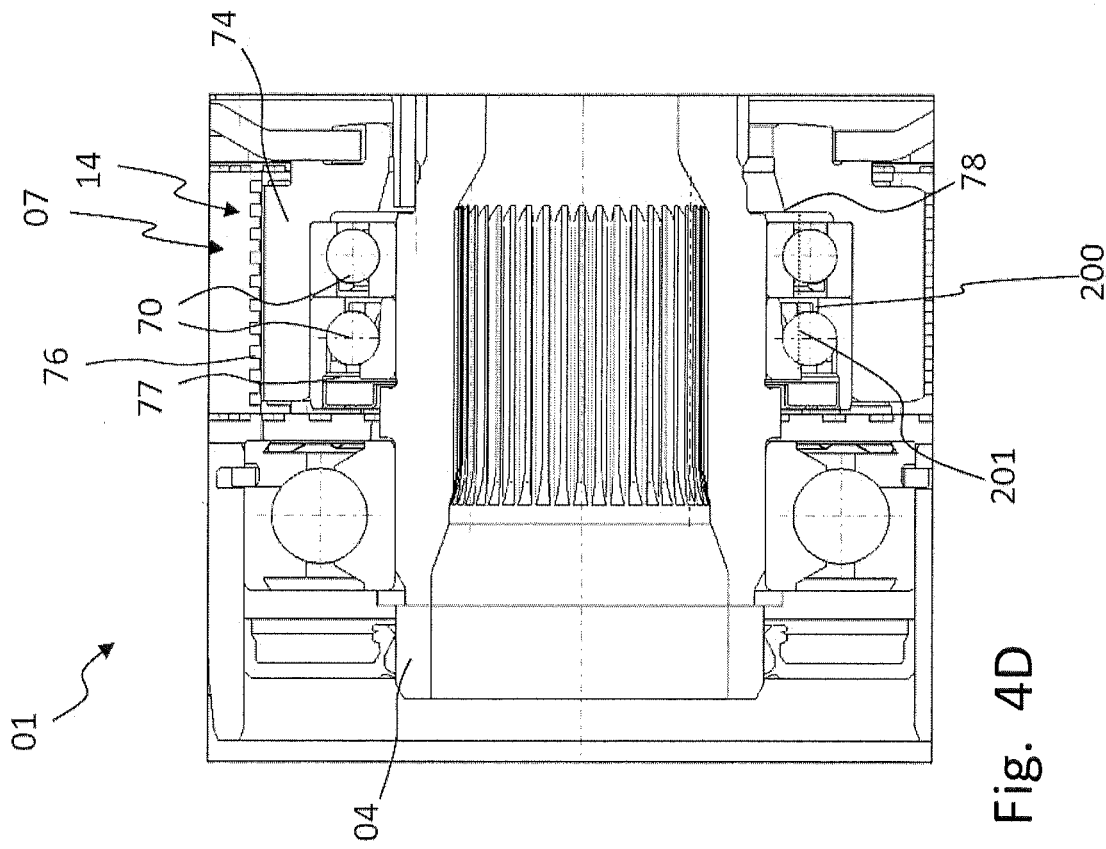
Fig. 4A    Fig. 4B    Fig. 4C
Fig. 4D

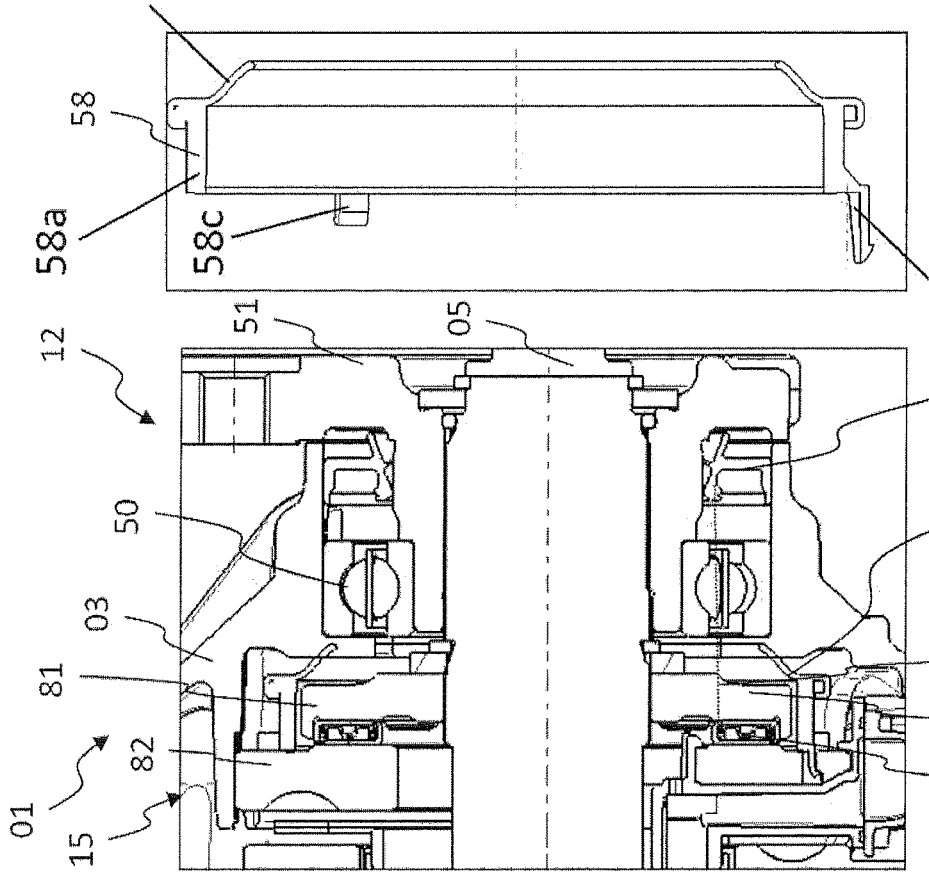

TRANSFER GEAR

CROSS-REFERENCE TO RELATED APPLICATIONS

This application claims the benefit and priority of German Application No. DE102014209700.2 filed May 21, 2014 and German Application No. DE102015208630.5 filed May 8, 2015. The entire disclosure of each of the above applications is incorporated herein by reference.

TECHNICAL FIELD

The present disclosure relates to a transfer gear having a housing which surrounds a housing interior and comprises the following assemblies: a first assembly comprising a drive shaft which is mounted so as to be rotatable in the housing and/or relative to at least one part of at least one other assembly by way of at least one drive shaft bearing; a second assembly comprising a primary shaft which is permanently coupled to the drive shaft and which is mounted so as to be rotatable in the housing and/or relative to at least one part of at least one other assembly by way of at least one primary shaft bearing; a third assembly comprising a secondary shaft which is arranged with an axial offset with respect to the drive shaft and which is mounted so as to be rotatable in the housing and/or relative to at least one part of at least one other assembly by way of at least one secondary shaft bearing; a fourth assembly comprising an offset gear which is arranged between the secondary shaft and drive shaft and bridges the axial offset thereof and which has one or more offset gear elements which, by means of offset gear bearings, are mounted so as to be rotatable in the housing and/or relative to at least one part of at least one other assembly; and a fifth assembly comprising a clutch, wherein the clutch is arranged between the drive shaft and offset gear and by means of said clutch the secondary shaft can be coupled to the drive shaft via the offset gear as required, having one or more clutch elements which are mounted so as to be rotatable in the housing and/or relative to at least one part of at least the same assembly and/or one other assembly by way of one or more clutch bearings; wherein the transfer gear has an oil sump which occupies a low point of the housing interior and which has an oil level lying above the low point, wherein the offset gear extends at least partially to a level below the oil level and, during operation of the secondary shaft, conveys oil out of the oil sump to bearings situated above the oil level, and wherein the bearings of the transfer gear are subdivided into bearings which participate exclusively in a "connect" operating mode of the transfer gear and bearings which continue to participate in a "disconnect" operating mode of the transfer gear, and wherein the transfer gear has one or more oil chambers which are situated above the oil level and which are supplied with oil by way of the offset gear in the "connect" operating mode of the transfer gear and which communicate at least with those bearings which are arranged above the oil level and which continue to participate in the "disconnect" operating mode of the transfer gear, wherein an oil chamber has a respective maximum fill level, and multiple oil chambers which have the same maximum fill level communicate with one another or are separated from one another.

BACKGROUND

This section provides background information related to the present disclosure which is not necessarily prior art.

Transfer gears are used in particular in motor vehicles with all-wheel drive in order to distribute an engine-generated torque, which is made available at a drive shaft of the transfer gear, to two output shafts of the transfer gear and thus to more than one driven axle. Here, each of the output shafts drives an axle of the motor vehicle or, if the motor vehicle has more than two driven axles, a final drive with drive-through facility.

Along the power flow from the engine to the driven axle, the transfer gear is normally arranged downstream of the main transmission of the drive engine, which serves for stepping up the torque generated by the drive engine.

Transfer gears are, depending on their type of construction, subdivided into so-called differential-controlled transfer gears and clutch-controlled transfer gears. In the case of differential-controlled transfer gears, a possibly manually or automatically lockable differential and/or a planetary gear set distributes the power flow to two output shafts that are permanently coupled to the drive shaft. In the case of clutch-controlled transfer gears, an automatically and/or manually actuated clutch, in particular a friction clutch, such as for example a multiplate clutch, or a viscous coupling with or a rigid coupling without rotational speed equalization, such as for example a claw coupling, distributes the power flow to two output shafts. Here, one output shaft, the so-called primary shaft, is permanently coupled to the drive shaft, and the remaining output shaft, the so-called secondary shaft, can be coupled to the drive shaft only as required.

Furthermore, transfer gears with activatable and deactivatable all-wheel drive are known which are duly not permanent but nevertheless have a differential gear and/or a planetary gear set which performs the distribution of the drive power when all-wheel drive is activated. In the case of this mixed embodiment, the all-wheel drive is differential-controlled but can also be deactivated and activated by way of one or more clutches. Since said transfer gears likewise have a clutch which activates and deactivates the secondary shaft, they are likewise regarded as clutch-controlled transfer gears.

For completeness, it is pointed out that transfer gears are also known which make do entirely without a clutch and without a differential gear or planetary gear set, for example if the wheels on the driven axles have freewheel-type hubs.

Clutch-controlled transfer gears are also referred to as "disconnect"-capable transfer gears, as they enable one of the two output shafts to be decoupled from the drive shaft, and thus for the through drive and thus the transmission of torque from the drive shaft to one of the two output shafts to be deactivated. Thus, clutch-controlled or "disconnect"-capable transfer gears have a drive shaft, an output shaft which is referred to as primary shaft and which is permanently coupled to the drive shaft, and an output shaft which is referred to as secondary shaft and which can be coupled to (and decoupled from) the drive shaft by way of a clutch.

Transfer gears may furthermore have an offset gear if the output shafts have an axial offset with respect to one another and/or one of the two output shafts has an axial offset with respect to a drive shaft which is or can be connected to the engine of a motor vehicle. As an offset gear, use is made of gear trains comprising a gearwheel set with intermeshing gearwheels which are for example in the form of spur gears and which are each arranged rotationally conjointly on the shafts which have an axial offset, and/or traction mechanism drives in which a torque is transmitted between the axially offset shafts by means of a traction mechanism which is looped around both shafts. In this case, use is preferably made of positively locking traction mechanism drives such as for example chain drives or toothed-belt drives, in which the torque is transmitted by way of wheels, which will hereinafter be referred to as sprockets and which are for example in the form of gearwheels and which have a corresponding positively locking profile, from a first shaft to the respective traction mechanism and from the traction mechanism to the second shaft, which has an axial offset with respect to the first shaft.

The traction mechanism and/or the gearwheel set of the offset gear is normally additionally used to convey oil from a low-oil sump to one or more bearings of the transfer gear which are situated at a higher level, in order for said bearings to be lubricated and cooled for the purposes of reducing the drive torque thereof and the temperature thereof during the operation of the motor vehicle.

A disadvantage of this is that, in the case of clutch-controlled or "disconnect"-capable transfer gears, said lubrication is absent when a secondary shaft, which is driven by way of the offset gear, is for example automatically or manually fully deactivated during the operation of the motor vehicle. Such complete immobilization of the secondary shaft is normally realized by way of one or more further separating clutches which are independent of the transfer gear clutch and which effect a decoupling of the secondary shaft from the gears which are driven by way of the secondary shaft and/or from the differential which is driven by way of the secondary shaft. This is realized for example when the all-wheel drive motor vehicle is being driven on a high-grip roadway with only one axle being driven by way of the primary shaft.

This leads to increased fuel and drive energy consumption owing to increasing friction and temperature of the now no longer lubricated bearings, and can lead to overheating, and in the worst case destruction, of the transfer gear, which in turn is associated with a considerable impairment of the roadworthiness of motor vehicles equipped therewith.

DE 39 42 411 A1 has disclosed a clutch-controlled or "disconnect"-capable transfer gear with an offset gear which comprises sprockets and chain and with a clutch in the form of a multiplate clutch. The transfer gear has a drive shaft, a primary shaft which is arranged coaxially with respect to the drive shaft and which is connected rotationally conjointly to the drive shaft, and a secondary shaft, which is arranged with an axial offset with respect to the drive shaft. The offset gear comprises a first sprocket, which is arranged coaxially with respect to the drive shaft and which is mounted so as to be rotatable relative to the drive shaft, a second sprocket, which is connected rotationally conjointly to the secondary shaft, and a chain which is looped around the two sprockets. The multiplate clutch is arranged coaxially with respect to the drive shaft and with respect to the primary shaft and has multiple first clutch discs, which are connected rotationally conjointly to the drive shaft and to the primary shaft arranged in a coaxial elongation of the drive shaft, and multiple second clutch discs, which are connected rotationally conjointly to the first sprocket and which are mounted in a housing of the transfer gear so as to be rotatable independently of the drive shaft.

Thus, the offset gear is decoupled from the drive shaft and from the primary shaft when the secondary shaft is deactivated by way of the multiplate clutch arranged coaxially with respect to the drive shaft and with respect to the primary shaft. A drive shaft bearing and a unilaterally encapsulated sprocket bearing are situated, in structural terms, in a closed-off space within the housing. The space is partially filled with oil, wherein the sprocket, which is connected to the secondary shaft arranged below the drive shaft, is situated entirely below the oil level. The transfer gear has a lubricant pump in order that drive shafts and sprocket bearings situated above the oil level are supplied with oil, and thus lubricated, even in the event of the secondary shaft being deactivated and, as a result, the chain being deactivated.

DE 10 2008 058 278 A1 has disclosed a clutch-controlled or "disconnect"-capable transfer gear with a housing, with an offset gear which comprises a gearwheel set, and with a clutch designed as a multiplate clutch. The transfer gear has, rotatably mounted in the housing, a primary shaft which is arranged coaxially with respect to the drive shaft, a clutch which is arranged coaxially with respect to said primary shaft and which is in the form of a multiplate clutch, and a secondary shaft which is arranged below the primary shaft with an axial offset and which is connected rotationally conjointly to a gearwheel of the gearwheel set. A lubricant pump conveys oil for the lubrication of drive shaft bearing, primary shaft bearing and multiplate clutch, and of gearwheel set bearings situated above the oil level, from a low-lying, partially oil-filled chamber, referred to as oil sump, within the housing of the transfer gear. To reduce splashing losses of the gearwheel set, an intermediate reservoir of which releases a part of the conveyed oil again with a delay is provided at mid-height between the primary shaft and oil sump. A drive shaft sealing ring which seals off the housing against oil losses is arranged with a spacing in the axial direction with respect to the drive shaft bearing as viewed along the drive or primary shaft.

The above-described clutch-controlled or "disconnect"-capable transfer gears which are known from the prior art and which have coaxially arranged drive shaft and primary shaft, an offset gear for driving the secondary shaft, and a clutch arranged between drive shaft and offset gear, have in common the need for a lubricant pump, which entails a correspondingly high level of outlay in terms of construction and an additional energy demand for driving the lubricant pump.

DE 10 2004 056 841 A1 has disclosed a differential-controlled transfer gear with a housing and with an offset gear which comprises a gearwheel set. The output shafts are arranged at an angle with respect to one another. To compensate for the angle, the gearwheel set has level gears. Output shaft sealing rings which seal off a housing interior against oil losses are, as viewed from outside the housing interior, arranged in front of the output shaft bearings with a spacing in each case in the axial direction along the output shafts.

SUMMARY

This section provides a general summary of the disclosure and is not intended to be an exhaustive and comprehensive disclosure of all its features, aspects or objects and/or its full scope.

It is an object of the present disclosure to provide a clutch-controlled or "disconnect"-capable transfer gear with an offset gear, in which adequate lubrication of all bearings is ensured even when the transfer gear is operated while the offset gear is deactivated ("disconnect" operating mode).

Accordingly, to achieve the stated object there is provided a clutch-controlled or "disconnect"-capable transfer gear having a housing which surrounds a housing interior. The transfer gear comprises the following assemblies: a first assembly including a drive shaft which is mounted so as to be rotatable in the housing and/or relative to at least one part of at least one other assembly by way of at least one drive shaft bearing; a second assembly including a primary shaft which is permanently coupled to the drive shaft and which is mounted so as to be rotatable in the housing and/or relative to at least one part of at least one other assembly by way of at least one primary shaft bearing; a third assembly including a secondary shaft which is arranged with an axial offset with respect to the drive shaft and which is mounted so as to be rotatable in the housing and/or relative to at least one part of at least one other assembly by way of at least one secondary shaft bearing; a fourth assembly including an offset gear which is arranged between the secondary shaft and drive shaft and bridges the axial offset thereof and which has one or more offset gear elements which, by means of offset gear bearings, are mounted so as to be rotatable in the housing and/or relative to at least one part of at least one other assembly, and a fifth assembly including a clutch arranged between the drive shaft and offset gear and by means of said clutch the secondary shaft can be coupled to the drive shaft via the offset gear as required, the clutch having one or more clutch elements which are mounted so as to be rotatable in the housing and/or relative to at least one part of at least the same assembly and/or one other assembly by way of one or more clutch bearings.

Furthermore, the transfer gear of the present disclosure comprises an oil sump which occupies a low point of the housing interior and which has an oil level lying above the low point, wherein the offset gear extends at least partially to a level below the oil level and, during operation of the secondary shaft, conveys oil out of the oil sump to bearings situated above the oil level, and wherein the bearings of the transfer gear are subdivided into bearings which participate exclusively in a "connect" operating mode of the transfer gear and bearings which continue to participate in a "disconnect" operating mode of the transfer gear, wherein the transfer gear has one or more oil chambers which are situated above the oil level and which are supplied with oil by way of the offset gear in the "connect" operating mode of the transfer gear and which communicate at least with those bearings which are arranged above the oil level and which continue to participate in the "disconnect" operating mode of the transfer gear, wherein an oil chamber has a respective maximum fill level, and multiple oil chambers which have the same maximum fill level communicate with one another or are separated from one another.

According to the present disclosure, a distinction is made between two operating modes of the transfer gear according to the invention. The operating modes include a "disconnect" operating mode and a "connect" operating mode. When the transfer gear is operating in its "disconnect" operating mode, the offset gear is decoupled from the drive shaft (deactivated) by way of the clutch of the transfer gear, the primary shaft is driven, and the secondary shaft is not driven. In contrast, when the transfer gear is operating in its "connect" operating mode, the offset gear is coupled to the drive shaft by way of the clutch of the transfer gear, the primary shaft is driven, and the secondary shaft is driven.

The housing of the transfer gear according to the present disclosure is preferably made up of at least two parts, a housing lower part and a housing cover, wherein, according to the invention, the housing encloses a housing interior.

According to the present disclosure, the primary shaft is fixedly connected to and/or formed integrally with the drive shaft.

The offset gear of the transfer gear according to the present disclosure comprises multiple offset gear elements. The offset gear preferably has an upper gearwheel, which is situated higher than the oil level of the oil sump, and a lower gearwheel, which at least partially splashes in the oil sump, that is to say is at least partially situated below the oil level of the oil sump. The upper gearwheel is mounted rotatably on the drive shaft by means of at least one offset gear bearing. A traction mechanism is looped around the upper gearwheel and the lower gearwheel. The traction mechanism at least partially splashes in the oil sump in the region of the lower gearwheel. The said offset gear elements of the offset gear of the transfer gear according to the invention thus preferably include an upper gearwheel, a lower gearwheel and a traction mechanism. The traction mechanism of the offset gear is preferably a chain or a toothed belt.

According to the above-described distinction between the two operating modes—"disconnect" operating mode and "connect" operating mode—it is necessary in the case of the transfer gear according to the present disclosure to make a distinction between bearings that participate in the "connect" operating mode and bearings that participate in the "disconnect" operating mode.

Bearings that participate in the "connect" operating mode are bearings which participate exclusively in the "connect" operating mode of the transfer gear according to the invention, that is to say during operation of the offset gear and the secondary shaft, and which only then require lubrication.

Bearings that participate in the "disconnect" operating mode are bearings which continue to participate, and require lubrication, in the "disconnect" operating mode of the transfer gear, that is to say in the event of decoupling of the offset gear from the drive shaft by means of the clutch of the transfer gear according to the invention and complete deactivation of the secondary shaft.

The bearings that participate in the "disconnect" operating mode are arranged at a level above the oil level of the oil sump, wherein the levels of the individual bearings that participate in the "disconnect" operating mode may differ from one another.

The transfer gear according to the present disclosure is characterized by one or more oil chambers which are situated above the oil level and which are supplied with oil by way of the offset gear in the "connect" operating mode and which communicate at least with the bearings which are arranged above the oil level and which participate in the "disconnect" operating mode.

The expression "communicate" describes a fluidic connection between, for example, an oil chamber, an oil reservoir and/or an arbitrary component and an arbitrary further oil chamber, oil reservoir and/or component.

For example, if only one oil chamber is provided, the latter communicates at least with all of the bearings which are arranged above the oil level and which participate in the "disconnect" operating mode.

By contrast, it is preferable for two or more oil chambers to be provided, wherein in each case one oil chamber communicates with at least one bearing which participates in the "disconnect" operating mode and/or with at least one group of bearings which participate in the "disconnect" operating mode.

If more than two oil chambers are provided, then provision is made of at least in each case one oil chamber for each one bearing situated at an individual level above the oil level, or for each one group of bearings situated at a common individual level above the oil level.

Accordingly, it is preferable for multiple oil chambers to be provided, at least in each case one oil chamber for each bearing situated at an individual level above the oil level, or for each group of bearings situated at a common level above the oil level.

Multiple oil chambers arranged at the same level above the oil level may communicate with one another or be separated from one another. Filling of the at least one oil chamber with oil takes place during the "connect" operating mode of the transfer gear, that is to say during the operation of the offset gear and thus of the secondary shaft.

An oil chamber preferably has a maximum fill level.

It is preferable for at least one first oil chamber to be provided which is associated with at least one drive shaft bearing.

It is preferably the case that the first oil chamber is, as viewed toward the outside from the housing interior, delimited by a drive shaft sealing ring arranged between the housing and the drive shaft. On its side facing away from the drive shaft sealing ring, the drive shaft bearing is formed unilaterally with a cover disc. In this way, the first oil chamber is, to the inside, that is to say in the direction of the housing interior, delimited by the unilaterally arranged cover disc of the drive shaft bearing. The cover disc prevents an oil volume enclosed between the drive shaft sealing ring and cover disc up to the height of the cover disc below the drive shaft from flowing out to the housing interior, and thus defines a maximum fill level of the first oil chamber.

The drive shaft bearing is preferably in the form of a rolling bearing with an inner ring, an outer ring and with rolling elements arranged between the inner ring and outer ring. Here, the cover disc is arranged for example between the outer ring and inner ring of the drive shaft bearing, which is in the form of a rolling bearing, below the drive shaft, and the height of the cover disc defines the maximum fill level of the first oil chamber.

The first oil chamber is filled with oil from the oil sump of the transfer gear in the "connect" operating mode of the transfer gear according to the invention. The traction mechanism of the offset gear at least partially splashes in the oil sump in the region of the lower gearwheel and, in the "connect" operating mode, conveys oil upward out of the oil sump, that is to say along the movement direction of the traction mechanism to a level above the oil level of the oil sump. Here, it is the case inter alia in the region of the upper gearwheel that, owing to centrifugal forces, the oil is flung against the internal wall of the housing. On the internal wall of the housing, there is formed a first lug-like oil-guiding rib which collects a part of the oil flung by the traction mechanism. The first oil-guiding rib is designed and positioned such that the oil flows out via an opening in the housing to the drive shaft bearing, and from there to the first oil chamber.

The opening in the housing preferably corresponds to a recess in the housing.

The first oil-guiding rib is formed in the manner of a lug on the internal wall of the housing and extends from the internal wall of the housing in the direction of the housing interior of the transfer gear according to the invention. The first oil-guiding rib thus serves for targetedly guiding the oil that is flung against the internal wall of the housing by the offset gear to the first oil chamber.

The first oil chamber is thermally well-connected to the housing. The housing serves in this case as a temperature sink.

Alternatively or in addition, at least one second oil chamber is provided which is associated with at least one offset gear bearing.

It is preferably the case that the second oil chamber is delimited by an at least unilateral covering of at least one offset gear bearing. The covering may comprise a sealing disc provided on an offset gear bearing, or a sealing ring arranged axially with respect to an offset gear bearing. Alternatively or in addition, the covering may comprise a centrifuging disc with a radial seal. On that side of the at least one offset gear bearing which faces away from the covering, the second oil chamber can be delimited by a shoulder in a central opening, which surrounds the at least one offset gear bearing at its outer circumference, of the offset gear element which is rotatably mounted by means of the at least one offset gear bearing. The shoulder forms, within the central opening of the offset gear element, a for example stepped set-back portion at which the central opening narrows in a radial direction as viewed from the at least one offset gear bearing. In this way, the second oil chamber is delimited at one side by the shoulder in the central opening of the offset gear element, and encapsulated at the other side by the covering, which is preferably in the form of a centrifuging disc with a radial seal.

The offset gear element just described is preferably the upper gearwheel.

Lubrication of the at least one offset gear bearing is ensured by way of the second oil chamber even when the secondary shaft is deactivated ("disconnect" operating mode).

The second oil chamber preferably has a maximum fill level of the second oil chamber. The maximum fill level of the second oil chamber corresponds to the height of the covering, which is for example in the form of a centrifuging disc, below the drive shaft.

The second oil chamber is thermally well-connected to the shaft. The shaft serves in this case as a temperature sink.

Alternatively or in addition, at least one third oil chamber is provided which is associated with at least one primary shaft bearing and/or at least one clutch bearing.

It is preferable for the third oil chamber to communicate with the at least one primary shaft bearing and with the at least one clutch bearing in order to ensure the service life thereof even during the deactivation of the secondary shaft ("disconnect" operating mode).

The third oil chamber connects the lubrication of the at least one primary shaft bearing to the lubrication of the at least one clutch bearing. Here, an adequately large third oil chamber is realized preferably by way of a connecting element.

The connecting element preferably comprises an axial seal with respect to the housing of the transfer gear—it is thus possible for an adequately large third oil chamber to be formed which ensures both the lubrication of the primary shaft bearing and the lubrication of the clutch bearing.

The connecting element is in this case manufactured from a material with good thermal conductivity.

In particular, in this way, the at least one clutch bearing is thermally well-connected to the housing which serves as a temperature sink.

The connecting element with axial seal is preferably designed such that the resulting component tolerances are compensated.

The third oil chamber is preferably delimited at one side by an edge in the housing and/or a flange of the primary shaft and/or by a sealing ring arranged between the housing and primary shaft and at the other side by a clutch bearing which is remote from the edge in the housing and/or from the flange of the primary shaft and/or from the sealing ring arranged between housing and primary shaft.

The maximum fill level of the third oil chamber is preferably defined for the at least one primary shaft bearing, preferably embodied as a deep-groove ball bearing, by way of the edge in the housing and/or by way of the flange of the primary shaft and/or by way of the sealing ring between housing and primary shaft and for the at least one clutch bearing by way of an inner radial edge of the clutch element, which is supported by way of the at least one clutch bearing so as to be rotatable relative to the housing and/or the drive shaft and/or the primary shaft.

The third oil chamber is thermally well-connected to the housing. The housing serves in this case as a temperature sink.

An oil-guiding diverting element is preferably arranged above the oil level of the oil sump.

The oil-guiding diverting element serves for conveying the oil from the oil sump of the transfer gear according to the invention from the offset gear to the second oil chamber and to the third oil chamber.

The second and third oil chambers are filled with oil from the oil sump of the transfer gear in the "connect" operating mode of the transfer gear according to the invention.

The traction mechanism of the offset gear at least partially splashes in the oil sump in the region of the lower sprocket, and in the "connect" operating mode, conveys oil upward out of the oil sump, that is to say to a level above the oil level of the oil sump, along the movement direction of the chain. Here, it is the case inter alia in the region of the upper gearwheel that the oil is flung against the internal wall of the housing owing to centrifugal forces. On the internal wall of the housing there is preferably formed a second oil-guiding rib, which is formed in the manner of a lug and collects a part of the oil that is flung from the traction mechanism. The second oil-guiding rib is designed and positioned such that the oil flows out into an intermediate oil reservoir.

The second oil-guiding rib is likewise preferably formed in the manner of a lug on the internal wall of the housing and extends from the internal wall of the housing in the direction of the housing interior of the transfer gear according to the invention.

The intermediate oil reservoir is preferably connected to the housing and/or formed integrally with the housing.

The intermediate oil reservoir is fluidically connected by way of an oil line to the oil-guiding diverting element, such that oil can flow from the intermediate oil reservoir to the oil-guiding diverting element. The oil flow is in this case ensured by way of the hydrostatic pressure in the intermediate oil reservoir.

The oil supplied from the intermediate oil reservoir via the oil line is preferably diverted by way of the oil-guiding diverting element through approximately 90° to an oil distributor. The oil-guiding diverting element thus supplies oil to the oil distributor, wherein oil is in turn supplied by way of the oil distributor to the second oil chamber.

The oil distributor comprises at least one lubrication finger, but preferably multiple lubrication fingers, and at least one oil chamber, but preferably multiple oil chambers.

By way of the lubrication fingers, oil is supplied preferably to the second oil chamber, such that by way of the second oil chamber, the lubrication of the at least one offset gear bearing in the "disconnect" operating mode of the transfer gear according to the invention is ensured. The clutch of the transfer gear is preferably supplied with oil by way of the oil chamber of the oil distributor.

The supply to the third oil chamber is realized preferably by way of a bore in the oil-guiding diverting element and/or by way of a guide rib system on the internal wall of the housing.

The guide rib system on the internal wall of the housing is formed preferably by way of a recess in the housing.

The volume or the volumes of the one or more oil chambers situated above the oil level is/are preferably dimensioned such that, with lubrication being ensured, the efficiency of the participating bearings is at a maximum.

In summary, by means of the at least one oil chamber which is situated above the oil level and which is filled by way of the offset gear in the "connect" operating mode of the transfer gear, preferably by means of the first, second and/or third oil chamber, adequate lubrication of all of the bearings which participate in the "disconnect" operating mode can be ensured over one tank fill of a motor vehicle equipped with a transfer gear of said type, which corresponds to a range of approximately 1200 kilometers.

The rotatably mounted clutch elements may comprise at least one first and one second clutch disc, which can be pressed against one another by way of an actuating apparatus.

The clutch may for example have at least one, preferably multiple first clutch disc(s), which is/are connected rotationally conjointly to the drive shaft and to the primary shaft arranged for example in an elongation of said drive shaft and coaxially with respect to the latter, and at least one, preferably multiple second clutch disc(s), which is/are mounted so as to be rotatable in the housing and/or relative to the drive shaft, preferably so as to be rotatable relative independently of the drive shaft.

Alternatively or in addition, the rotatably mounted clutch elements may have one or more elements of an actuating apparatus, also referred to as actuator arrangement, with at least one actuator ring. Accordingly, the clutch bearings may comprise one or more actuator arrangement bearings.

In an installed state in the motor vehicle, the secondary shaft may be arranged adjacent to and/or below the drive shaft.

The primary shaft may be arranged coaxially with respect to the drive shaft.

The clutch may be arranged coaxially with respect to the drive shaft.

For example, the transfer gear may have a lockable differential gear or planetary gear set which divides the power flow between primary and secondary shaft during operation of the secondary shaft.

It is evident that the present disclosure may be realized by providing a clutch-controlled or "disconnect"-capable transfer gear with an offset gear, in which separate oil chambers are provided at least for those bearings which, in the "disconnect" operating mode, are separated from the lubrication supply by the offset gear. The oil chambers are preferably dimensioned such that the oil quantity retained by them, or the oil volume retained by them, is adequate for lubrication for an operating duration corresponding to one tank fill of a motor vehicle equipped with a transfer gear of said type. The encapsulated, sealed-off oil chambers each form individual oil reserves for ensuring lubrication, in the case of the offset gear being deactivated, for an operating period corresponding to one tank fill of a motor vehicle equipped with a transfer gear of said type. Here, the oil level of the individual oil chambers is preferably set such that, with lubrication being ensured, maximum efficiency is realized.

Advantages over the prior art are attained not only from complete achievement of the stated object, with elimination of all disadvantages of the prior art, but also from the ensuring of lubrication of all of the bearings which are arranged above the oil level and which continue to participate in the "disconnect" operating mode, with the simultaneous omission of a lubricant pump, and without the need to accept losses in quality with regard to noise, vibration and harshness (NVH), service life, durability and efficiency.

The invention and the advantages thereof will be discussed in more detail below on the basis of exemplary embodiments illustrated in the figures. The proportions of the individual elements relative to one another in the figures do not always correspond to the real proportions, as in the figures, some forms are simplified and other forms are, for better illustration, illustrated on a larger scale than other elements. Identical reference signs are used for identical elements, or elements of the same action, of the invention. The illustrated embodiments constitute merely examples for the configuration of the transfer gear according to the invention, and do not constitute a conclusive delimitation.

DRAWINGS

The drawings described herein are for illustrative purposes only of selected embodiments and are not intended to limit the scope of the present disclosure. The drawings include:

FIGS. 4A through 4D illustrate multiple detail views of the transfer gear according to the invention illustrated in FIG. 2, in particular with regard to a second oil chamber;

FIGS. 5A through 5C illustrate multiple detail views of the transfer gear according to the invention illustrated in FIG. 2, in particular with regard to a third oil chamber;

Corresponding reference numerals indicate corresponding components in terms of structure and/or function throughout the several views shown in the drawings.

DESCRIPTION

Example embodiments of transfer gears are provided so that this disclosure will be thorough, and will fully convey the scope of those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
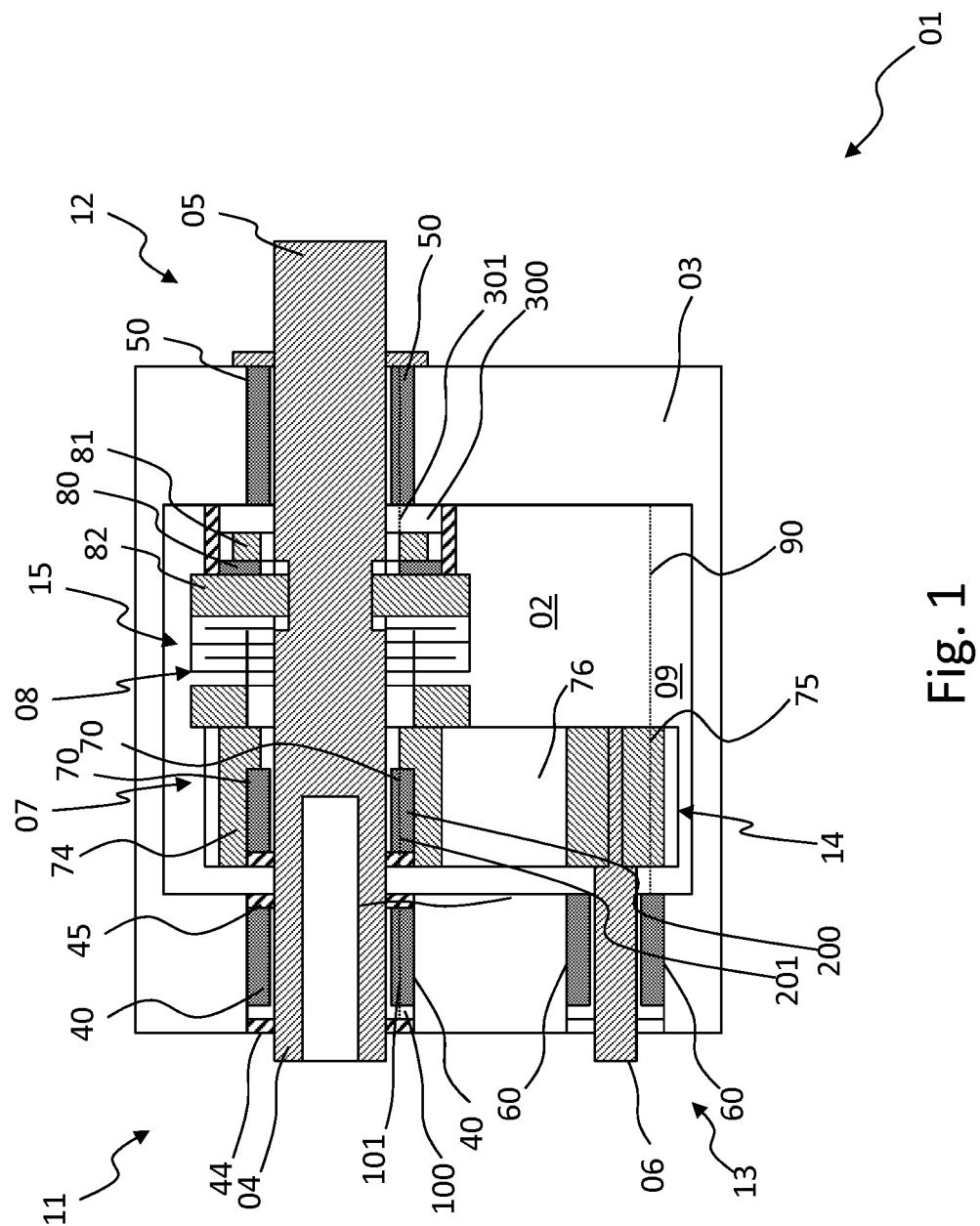
FIG. 1 illustrates a longitudinal section through an example embodiment of a transfer gear constructed according to the present disclosure.

The clutch-controlled or "disconnect"-capable transfer gear 01 according to the present disclosure comprises, as can be seen in particular in FIG. 1, a housing 03 which surrounds a housing interior 02, and substantially the following assemblies 11, 12, 13, 14, 15. In particular, first assembly 11 comprises a drive shaft 04 which is mounted so as to be rotatable in the housing 03 and/or relative to at least one part of at least one other assembly 12, 13, 14, 15 by way of at least one drive shaft bearing 40. Second assembly 12 comprises a primary shaft 05 which is permanently coupled to the drive shaft 04 and which is mounted so as to be rotatable in the housing 03 and/or relative to at least one part of at least one other assembly 11, 13, 14, 15 by way of at least one primary shaft bearing 50. Third assembly 13 comprises a secondary shaft 06 which is arranged with an axial offset with respect to the drive shaft 04 and which is mounted so as to be rotatable in the housing 03 and/or relative to at least one part of at least one other assembly 11, 12, 14, 15 by way of at least one secondary shaft bearing 60. Fourth assembly 14 comprises an offset gear 07 which is arranged between the secondary shaft 06 and drive shaft 04 and bridges the axial offset thereof and which has one or more offset gear elements 74, 75, 76 which, by means of offset gear bearings 70, are mounted so as to be rotatable in the housing 03 and/or relative to at least one part of at least one other assembly 11, 12, 13, 15. Finally, fifth assembly 15 comprises a clutch 08, wherein the clutch is arranged between the drive shaft 04 and offset gear 07 and by means of said clutch the secondary shaft 06 can be coupled to the drive shaft 04 via the offset gear 07 as required, having one or more clutch elements 81, 82 which are mounted so as to be rotatable in the housing 03 and/or relative to at least one part of at least the same assembly 15 and/or one other assembly 11, 12, 13, 14 by way of one or more clutch bearings 80.

The transfer gear 01 furthermore has an oil sump 09 which occupies a low point of the housing interior 02 of the housing 03 and which has an oil level 90 lying above the low point of the oil sump 09.

In the exemplary transfer gear 01 according to the present disclosure, the offset gear elements 74, 75, 76 of the offset gear 07 are an upper sprocket 74 (upper gearwheel 74), a lower sprocket 75 (lower gearwheel 75), and a chain 76 (traction mechanism 76).

The offset gear 07 of the transfer gear 01 comprises the upper sprocket 74, which is situated at a level higher than the oil level 90 of the oil sump 09, and the lower sprocket 75, which at least partially splashes in the oil sump 09, that is to say is situated at least partially below the oil level 90 of the oil sump 09. The upper sprocket 74 is mounted rotatably on the drive shaft 04 by means of at least one offset gear bearing 70. A chain 76 is looped around the upper sprocket 74 and the lower sprocket 75. The chain 76 at least partially splashes in the oil sump 09 in the region of the lower sprocket 75.

Figure 2:
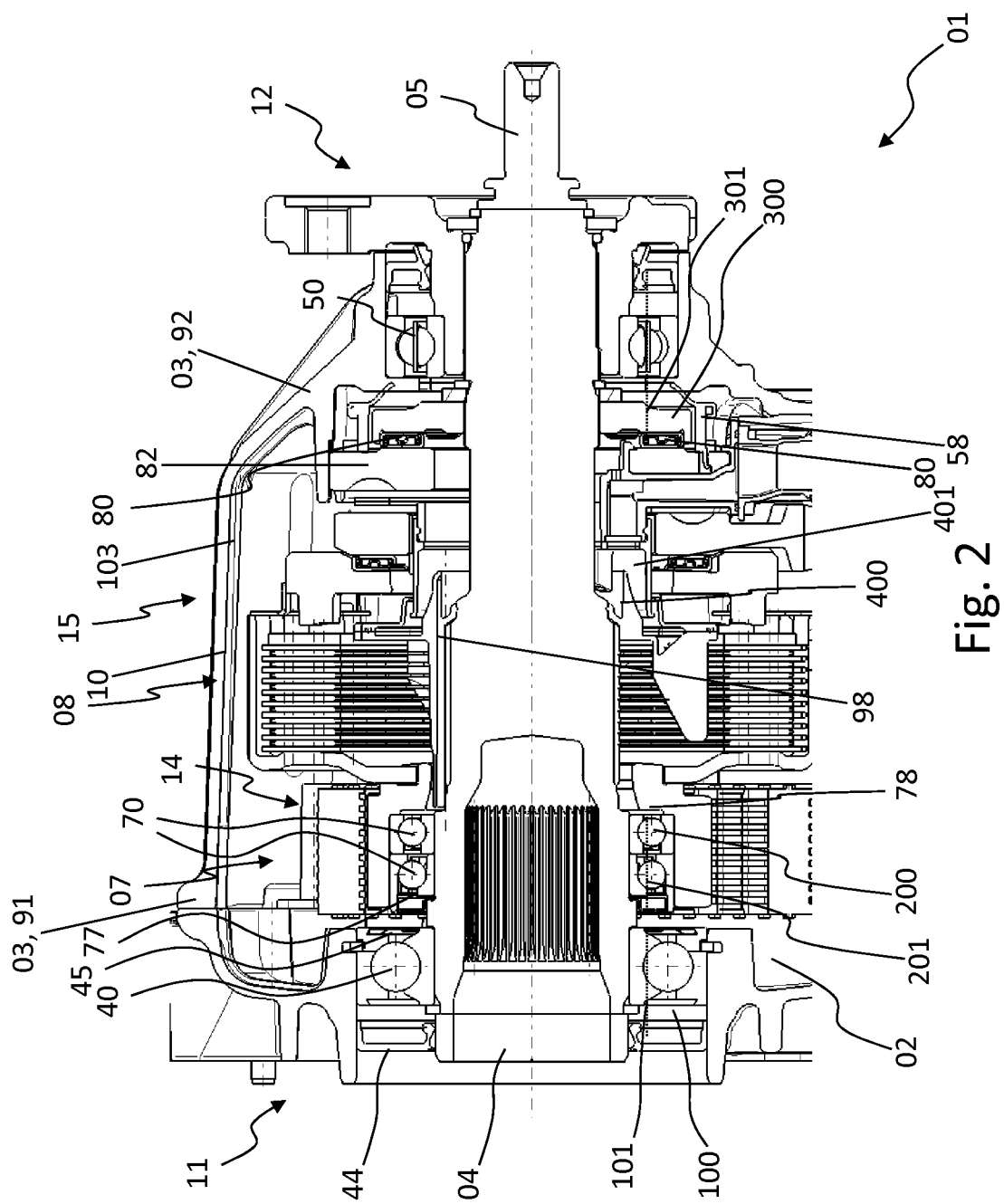
FIG. 2 illustrates a partial view of a longitudinal section through an exemplary transfer gear according to the present disclosure, with all of the bearings and oil chambers that continue to participate in the "disconnect" operating mode.
Figures 3A, 3B, 3C, 3D:
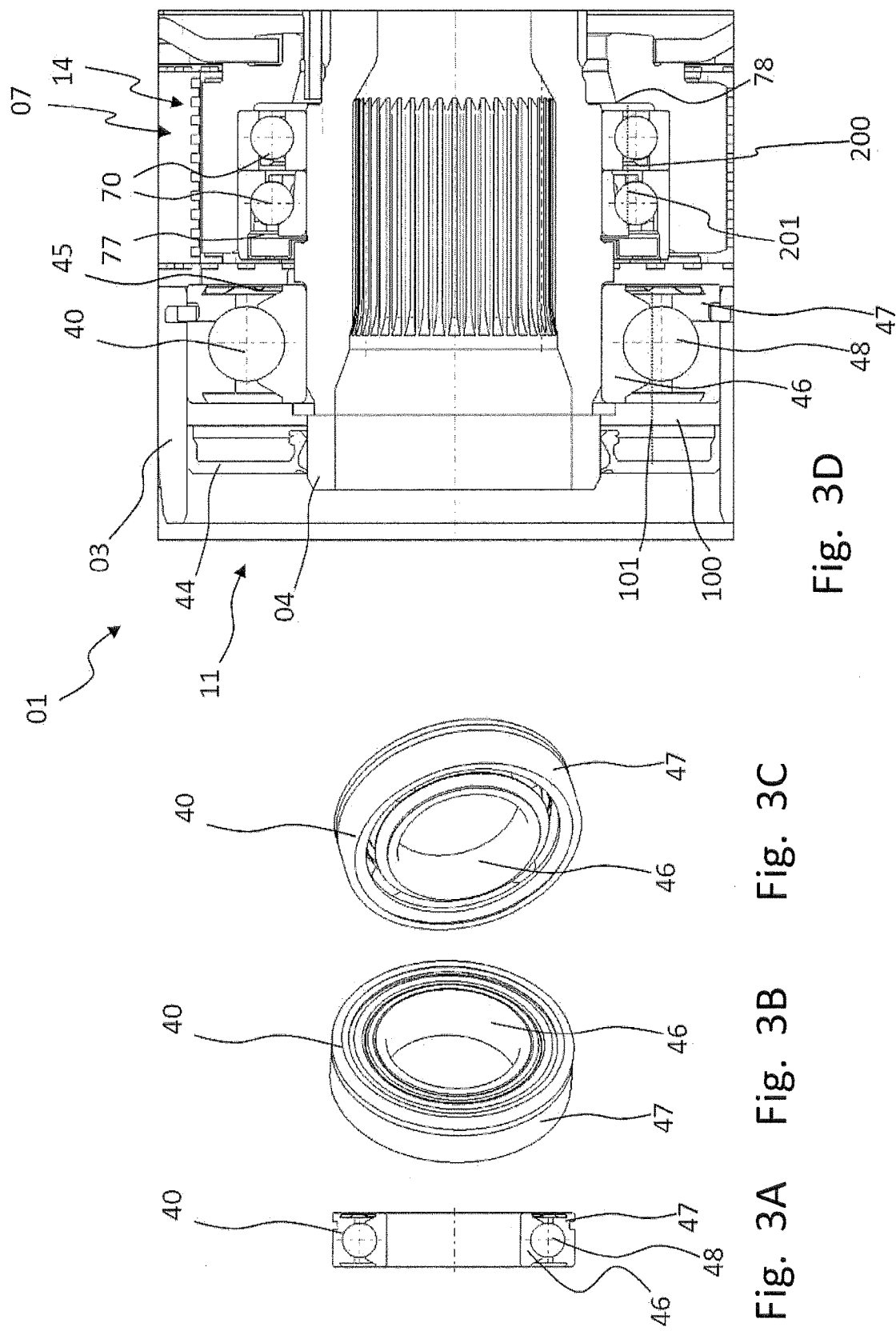
FIGS. 3A through 3D illustrate multiple detail views of the transfer gear according to the invention illustrated in FIG. 2, in particular with regard to a first oil chamber.

As can be seen in FIG. 2, the housing 03 comprises a housing cover 91 and a housing lower part 92.

The bearings 40, 50, 60, 70, 80 of the transfer gear 01 are subdivided into bearings 60 which participate exclusively in the "connect" operating mode and bearings 40, 50, 70, 80 which continue to participate in the "disconnect" operating mode.

FIG. 2 illustrates a partial view of a longitudinal section through an exemplary transfer gear 01 according to the present disclosure, with all of the bearings 40, 50, 70, 80 which continue to participate in the "disconnect" operating mode and with three oil chambers 100, 200, 300.

In the "connect" operating mode of the transfer gear 01, the offset gear 07 conveys oil out of the oil sump 09 to the bearings 40, 50, 70, 80 which participate in the "disconnect" operating mode.

The transfer gear 01 is configured to include one or more oil chambers 100, 200, 300 which are situated above the oil level 90 of the oil sump 09 and which are supplied with oil by way of the offset gear 07 in the "connect" operating mode and which communicate at least with those bearings 40, 50, 70, 80 which are arranged above the oil level 90 and which continue to participate in the "disconnect" operating mode of the transfer gear 01.

In order, in the "connect" operating mode of the transfer gear 01, to convey oil out of the oil sump 09 to bearings 40, 50, 70, 80 situated at a higher level, that is to say to the bearings 40, 50, 70, 80 which participate in the "disconnect" operating mode, the chain 76 of the offset gear 07 at least partially splashes in the oil sump 09 of the transfer gear 01.

The secondary shaft bearings 60, which participate exclusively during operation of the secondary shaft 06, require lubrication only in the "connect" operating mode of the transfer gear 01, because in the "disconnect" operating mode of the transfer gear 01, no rotational movements occur between the components, the housing 03 and the secondary shaft 06, which can rotate relative to one another by way of the secondary shaft bearing 60.

The bearings 40, 50, 70, 80 which continue to participate in the "disconnect" operating mode however require lubrication even after the deactivation of the offset gear 07, that is to say in the "disconnect" operating mode of the transfer gear 01, because rotational movements continue to take place between the components 03, 04; 04, 71; 03, 05; 81, 82, which can rotate relative to one another by way of said bearings 40, 50, 70, 80.

Here, not all of the oil chambers 100, 200, 300 communicate with all of the bearings 40, 50, 70, 80 which participate in the "disconnect" operating mode. Each bearing 40, 50, 70, 80 which is arranged above the oil level 90 and which continues to participate in the "disconnect" operating mode, and/or one or more groups of in each case one or more bearings 40, 50, 70, 80 which continue to participate in the "disconnect" operating mode, is/are fluidically connected to an oil chamber 100, 200, 300 which is arranged at a level, suitable for the one or more respective bearings 40, 50, 70, 80, above the oil level 90.

For example, if only one oil chamber is provided, the latter communicates at least with all of those bearings 40, 50, 70, 80 which are arranged above the oil level 90 and which continue to participate in the "disconnect" operating mode.

By contrast, if two or more oil chambers 100, 200, 300 are provided, these communicate with different bearings 40, 50, 70, 80 which participate in the "disconnect" operating mode or groups of bearings 40, 50, 70, 80 which participate in the "disconnect" operating mode.

Each oil chamber 100, 200, 300 has a maximum fill level 101, 201, 301.

It is important to point out at this juncture that, by contrast to the prior art, which discloses intermediate reservoirs which merely delay a return flow of oil into the oil sump 09, the one or more oil chambers 100, 200, 300 prevent a return flow of oil into the oil sump 09 in the presence of an oil level equal to or lower than a respective individual maximum fill level 101, 201, 301 of the respective oil chamber 100, 200, 300, and release oil for example in delayed fashion only in the presence of an oil level higher than the respective maximum fill level 101, 201, 301 thereof, which oil then flows back into the oil sump 09 of the transfer gear 01.

FIGS. 1 and 2 illustrate that, in the exemplary transfer gear 01 according to the invention, multiple oil chambers 100, 200, 300—a first oil chamber 100, a second oil chamber 200 and a third oil chamber 300—are provided.

The first oil chamber 100 has a maximum fill level of the first oil chamber 101, the second oil chamber has a maximum fill level of the second oil chamber 201 and the third oil chamber has a maximum fill level of the third oil chamber (FIG. 2).

Multiple oil chambers 100, 200, 300 which have the same maximum fill level 101, 201, 301 above the oil level 90 may communicate with one another or be separated from one another.

In the case of the exemplary transfer gear 01, a first oil chamber 100 is provided which is associated with a drive shaft bearing 40 (FIG. 2, FIGS. 3A-3D, FIGS. 4A-4D).

The first oil chamber 100 is, as viewed toward the outside from the housing interior 02, delimited by a drive shaft sealing ring 44 arranged between the housing 03 and drive shaft 04. To the inside, toward the housing interior 02, the first oil chamber 100 is preferably delimited by a cover disc 45 which is arranged unilaterally on that side of the drive shaft bearing 40 which faces away from the sealing ring 44, the height of which cover disc below the drive shaft 04 predefines the maximum fill level 101 of the first oil chamber 100. The cover disc 45 prevents an oil volume enclosed between the drive shaft sealing ring 44 and cover disc 45 up to the height of the cover disc 45 below the drive shaft 04 from flowing out to the housing interior 02.

The drive shaft bearing 04 is provided in the form of a rolling bearing with an outer ring 47 and inner ring 46 and rolling elements 48 arranged in between. The cover disc 45 is provided unilaterally between inner ring 46 and outer ring 47.

The first oil chamber 100 is thermally well-connected to the housing 03. The housing 03 acts in this case as a temperature sink.

The first oil chamber 100 is filled with oil from the oil sump 09 of the transfer gear 01 in the "connect" operating mode of the transfer gear 01 according to the invention.

Figure 7:
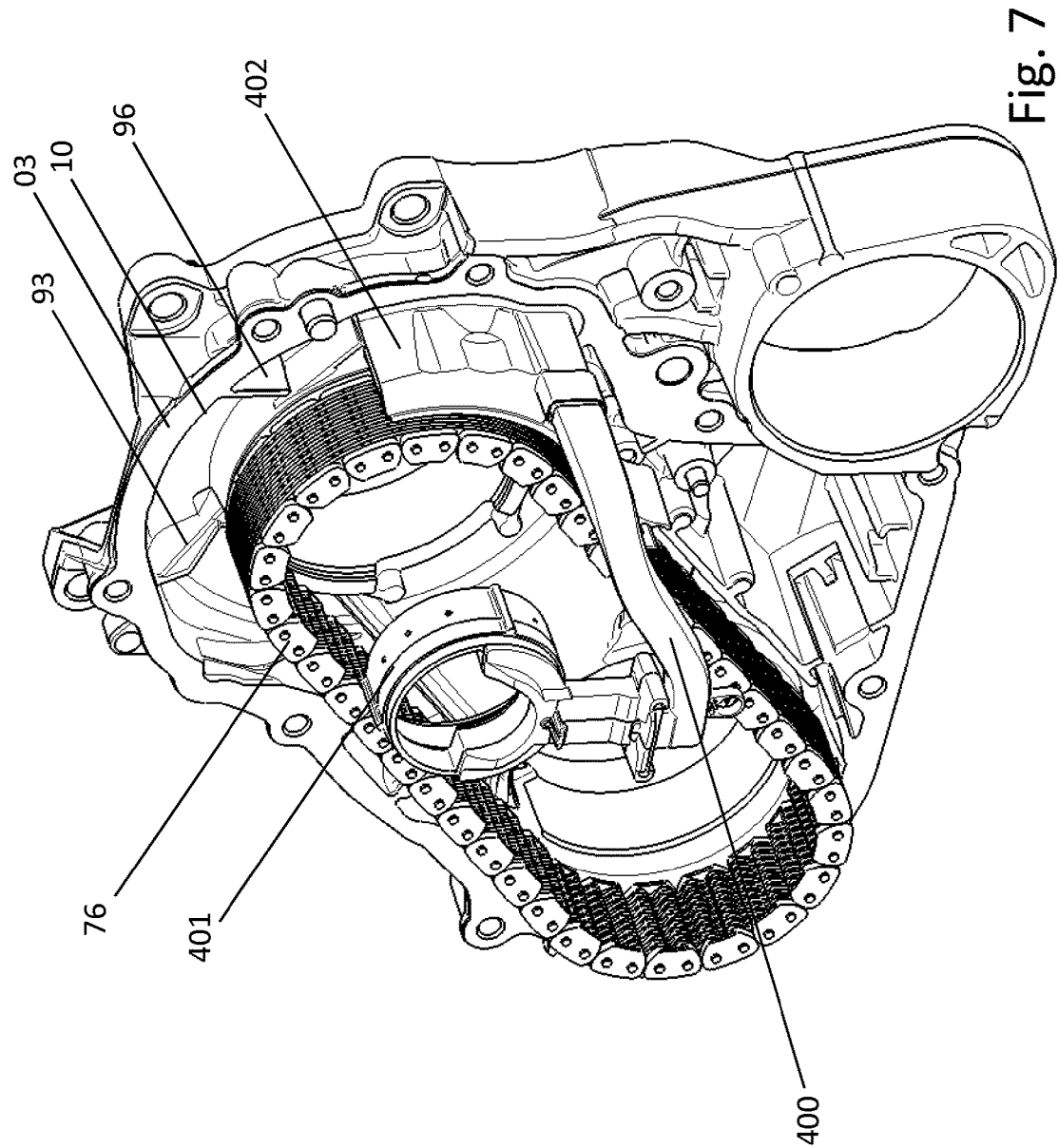
FIG. 7 illustrates a perspective detail view, in particular of the offset gear and of the oil-guiding diverting element.

The chain 76 of the offset gear 07 at least partially splashes in the oil sump 09 of the transfer gear 01 in the region of the lower sprocket 75 and, in the "connect" operating mode, conveys oil upward out of the oil sump 09, that is to say along the movement direction of the chain—in this case counterclockwise in FIG. 7—to a level above the oil level 90 of the oil sump 09. Here, it is the case inter alia in the region of the upper sprocket 74 that, owing to centrifugal forces, the oil is flung against the internal wall 10 of the housing 03. On the internal wall 10 of the housing 03, there is formed a first lug-like oil-guiding rib 93 which collects a part of the oil flung by the chain 76 of the offset gear 07 in the direction of the internal wall 10 of the housing 03. The first oil-guiding rib 93 is designed and positioned such that the oil flows out via an opening 94 in the housing 03 to the drive shaft bearing 40, and from there to the first oil chamber 100 (FIG. 7).

Figure 10:
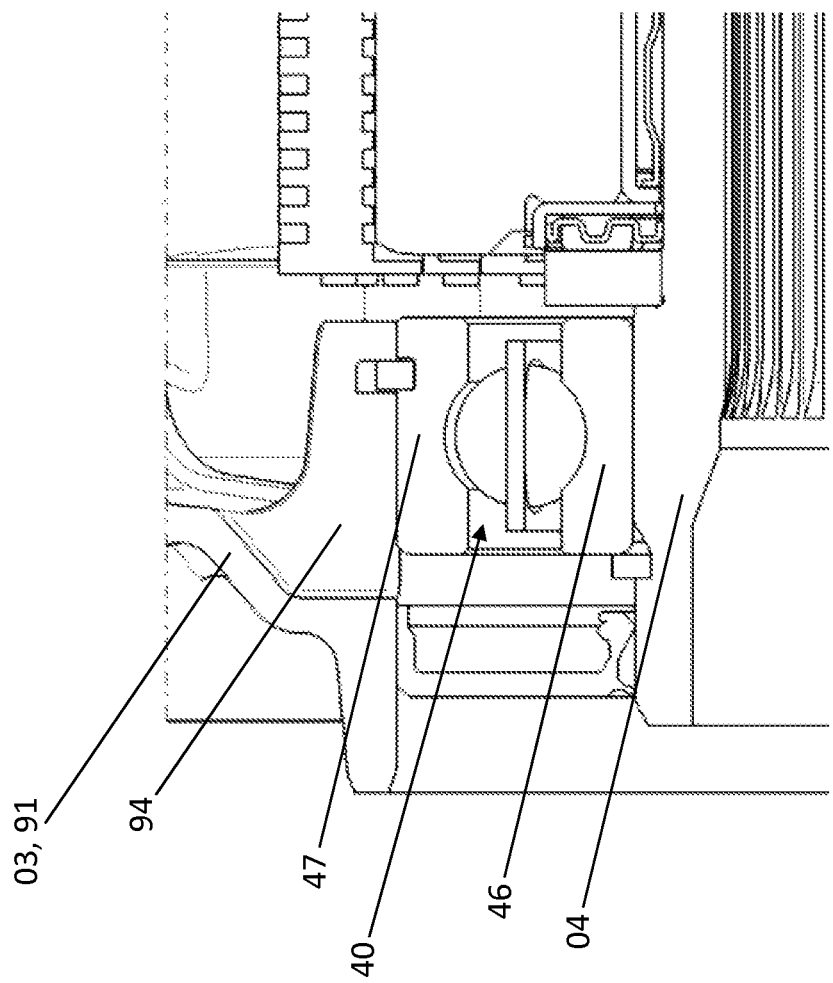
FIG. 10 illustrates a detail view of the opening in the housing in the region of the drive shaft bearing.

The opening 94 in the housing 03 corresponds to a recess 94 in the housing 03 (FIG. 10).

The first oil-guiding rib 93 is formed in the manner of a lug on the internal wall 10 of the housing 03 and extends from the internal wall 10 of the housing 03 in the direction of the housing interior 02 of the transfer gear 01 according to the invention (FIG. 7).

The first oil-guiding rib 93 thus serves for targetedly guiding the oil that is flung against the internal wall 10 of the housing 03 by the offset gear 07 to the first oil chamber 100.

In addition to the first oil chamber 100, there is provided in the exemplary transfer gear 01 a second oil chamber 200 which is associated with an offset gear bearing 70 (FIG. 2, FIGS. 3A-3D, FIGS. 4A-4D).

The second oil chamber 200 is delimited by a unilateral covering 77 of the offset gear bearing 70.

The height of the covering 77 for example below the drive shaft 04 or the primary shaft 05 corresponds to the maximum fill level 201 of the second oil chamber 200.

The covering 77 comprises a centrifuging disc with radial seal.

On that side of the at least one offset gear bearing 70 which faces away from the covering 77, the second oil chamber 200 is delimited by a shoulder 78 in a central opening, which surrounds the offset gear bearing 70 at its outer circumference, of the upper sprocket 74 which is rotatably mounted by means of the offset gear bearing 70. The shoulder 78 forms, within the central opening of the upper sprocket 74, a stepped set-back portion at which the central opening narrows in a radial direction as viewed from the offset gear bearing 70. In this way, the second oil chamber 200 is delimited at one side by the shoulder 78 in the central opening of the upper sprocket 74, and encapsulated at the other side by the covering 77, which is in the form of a centrifuging disc with a radial seal.

The offset gear bearing 70 of the upper sprocket 74 is lubricated by way of the second oil chamber 200 even during the "disconnect" operating mode of the transfer gear 01.

The second oil chamber 200 is thermally well-connected to the drive shaft 04 and/or to the primary shaft 05. The drive shaft 04 and/or primary shaft 05 act(s) as a temperature sink.

In addition to the first oil chamber 100 and the second oil chamber 200, the exemplary transfer gear 01 has a third oil chamber 300. The third oil chamber 300 serves for the supply of oil to a primary shaft bearing 50 and to a clutch bearing 80 of the exemplary transfer gear 01 (FIG. 2, FIGS. 5A-5C).

The third oil chamber 300 connects the lubrication of the primary shaft bearing 50 to the lubrication of the clutch bearing 80. Here, an adequately larger third oil chamber 300 is realized by way of a connecting element 58 (FIGS. 5A-5C, FIG. 6). The connecting element 58 necessitates an axial seal with respect to the housing 03 of the transfer gear 01—thus, it is possible for an adequately large third oil chamber 300 to be formed which ensures both the lubrication of the primary shaft bearing 50 and the lubrication of the clutch bearing 80.

The connecting element 58 is manufactured from a material with good thermal conductivity.

Details relating to the connecting element 58 emerge from the detail view of FIGS. 5B and 5C. The connecting element 58 is in the form of an annular element 58a with an encircling sealing lip 58b composed of a soft elastic material. The encircling sealing lip 58b is designed so as to be supported on the gear housing and bear against the latter such that an axial seal with respect to the gear housing is realized. Owing to the formation of the sealing lip 58b from a soft elastic material, resulting component tolerances can be compensated. The fastening of the connecting element 58 is realized by way of a clip-type connection. For this purpose, on the annular element 58a, there are formed detent tongues 58c which are distributed over the circumference and which are placed in detent engagement with corresponding detent depressions (not illustrated) on a clutch element 82. The clutch element 82 is preferably an actuator ring 82 of the clutch 08. As already discussed in more detail further above, the connecting element 58 serves for axial sealing of the third oil chamber 300 with respect to the gear housing, and realizes the connection of the lubrication of the at least one primary shaft bearing 50 to the lubrication of the at least one clutch bearing 80.

The third oil chamber 300 is delimited at one side by an edge in the housing 03 and/or by a flange 51 of the primary shaft 05 and/or by a sealing ring 52 arranged between housing 03 and primary shaft 05 and by a clutch bearing 80 which is spaced apart from the edge in the housing 03 and/or the flange 51 of the primary shaft 05 in the longitudinal direction along the primary shaft 05 in the direction of the drive shaft 04.

By means of the connecting element 58, the at least one clutch bearing 80 is thermally well-connected to the housing 03, which serves as a temperature sink.

The maximum fill level 301 of the third oil chamber 300 is defined for the primary shaft bearing 50, which is in the form of a deep-groove ball bearing, by way of the sealing ring 52 arranged between housing 03 and primary shaft 05 and for the clutch bearing 80 by way of a radially inner edge of a clutch element 81, 82, which is supported by way of the clutch bearing 80 so as to be rotatable relative to the housing 03 and/or the drive shaft 04 and/or the primary shaft 05.

The third oil chamber 300 is thermally well-connected to the housing 03.

An oil-guiding diverting element 401 is preferably arranged above the oil level 90 of the oil sump 09 (FIG. 6, FIG. 7, FIG. 8, FIG. 9).

The oil-guiding diverting element 401 serves for conveying the oil from the oil sump 09 of the transfer gear 01 according to the invention from the offset gear 07 to the second oil chamber 200 and to the third oil chamber 300.

The second oil chamber 200 and the third oil chamber 300 are filled with oil from the oil sump 09 of the transfer gear 01 in the "connect" operating mode of the transfer gear 01 according to the invention.

In the region of the lower sprocket 75, the chain 76 of the offset gear 07 at least partially splashes in the oil sump 09, and in the "connect" operating mode, conveys oil upward out of the oil sump 09, that is to say to a level above the oil level 90 of the oil sump 09, along the movement direction of the chain 76. Here, it is the case inter alia in the region of the upper sprocket 74 that the oil is flung against the internal wall 10 of the housing 03 owing to centrifugal forces. On the internal wall 10 of the housing 03 there is formed a second oil-guiding rib 96, which is formed in the manner of a lug and collects a part of the oil that is flung from the chain 76. The second oil-guiding rib 96 is designed and positioned such that the oil flows out into an intermediate oil reservoir 402 (FIG. 7).

The second oil-guiding rib 96 is, like the first oil-guiding rib 93, formed in the manner of a lug on the internal wall 10 of the housing 03 and extends from the internal wall 10 of the housing 03 in the direction of the housing interior 02 of the transfer gear 01 according to the invention.

The oil intermediate reservoir 402 is connected to the housing 03 or formed integrally with the housing 03.

The intermediate oil reservoir 402 is fluidically connected by way of an oil line 400 to the oil-guiding diverting element 401, such that oil can flow from the intermediate oil reservoir 402 to the oil-guiding diverting element 401. Here, the oil flow is ensured by way of the hydrostatic pressure in the intermediate oil reservoir 402.

The oil supplied from the intermediate oil reservoir 402 via the oil line 400 is diverted by way of the oil-guiding diverting element 401 through approximately 90° to an oil distributor 97. The oil-guiding diverting element 401 thus supplies oil to the oil distributor 97, wherein oil is in turn supplied by way of the oil distributor 97 to the second oil chamber 200 (FIG. 8, FIG. 9).

Figure 8:
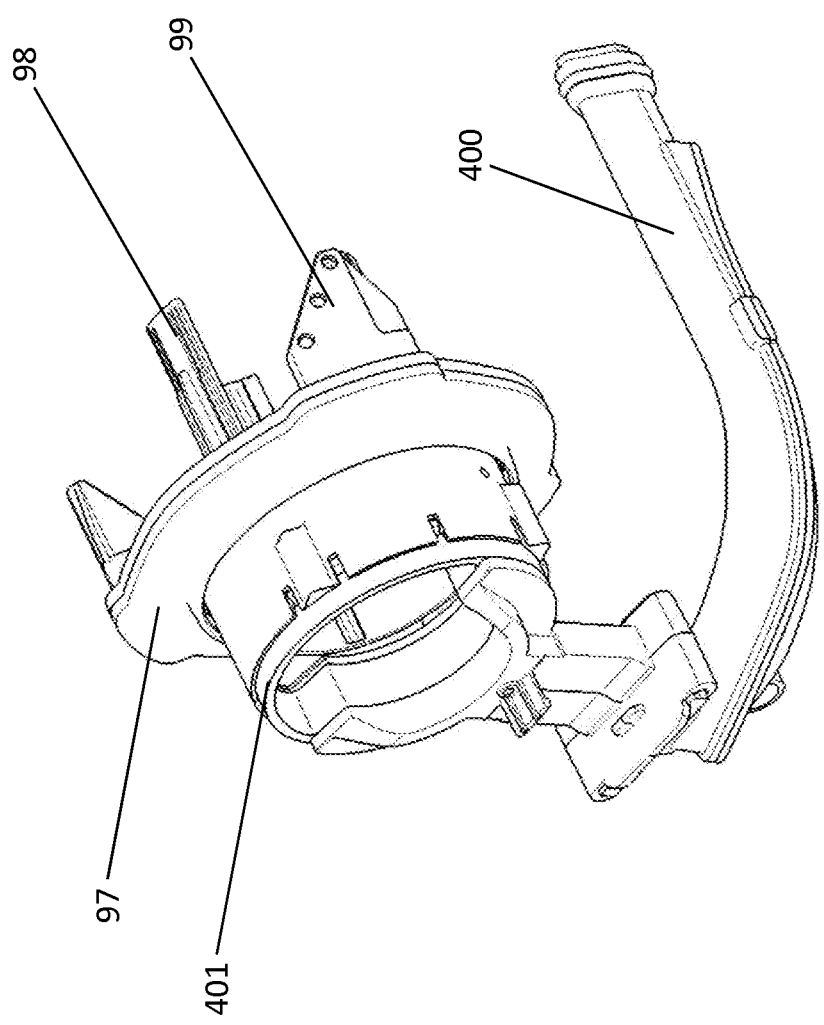
FIG. 8 illustrates a perspective detail view of an oil-guiding diverting element and of an oil distributor.
Figure 9:
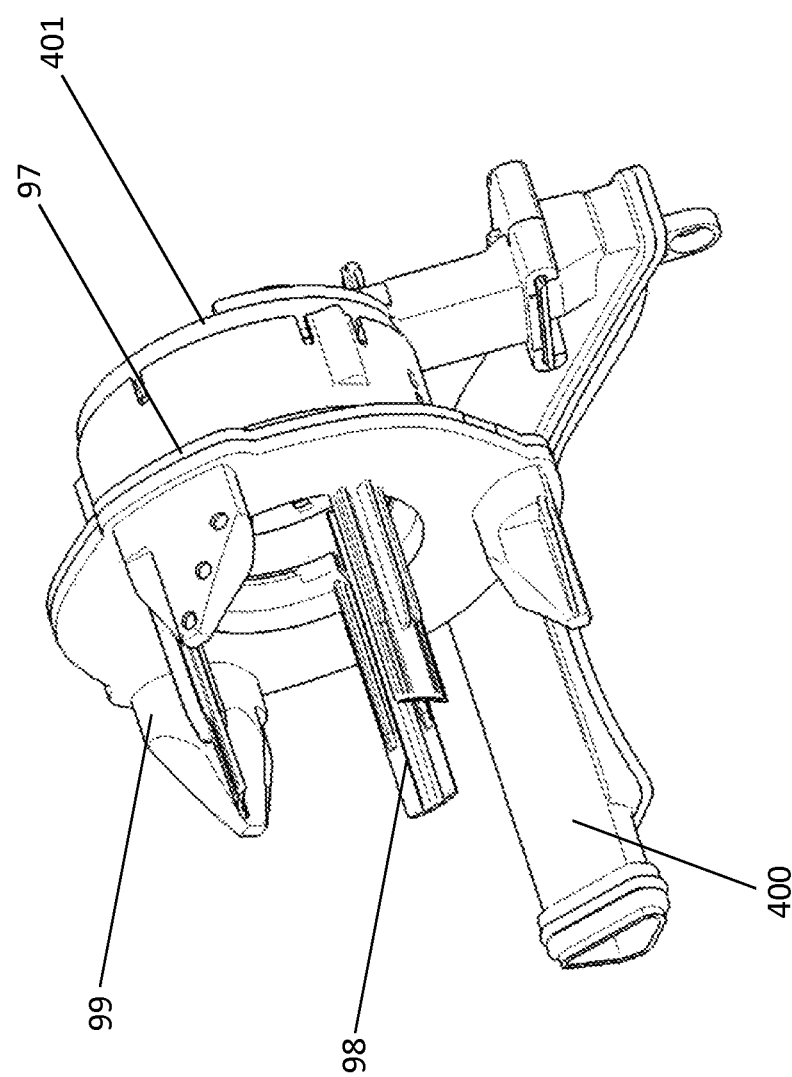
FIG. 9 illustrates a further perspective detail view of an oil-guiding diverting element and of an oil distributor.

The oil distributor 97 comprises multiple lubrication fingers 98, and multiple oil chambers 99 (FIG. 8, FIG. 9).

By way of the lubrication fingers 98, oil is supplied to the second oil chamber 200, such that by way of the second oil chamber 200, the lubrication of the offset gear bearing 70 in the "disconnect" operating mode of the transfer gear 01 according to the invention is ensured.

The clutch 08 of the transfer gear 01 is supplied with oil by way of the oil chamber 99 of the oil distributor 97.

The supply to the third oil chamber 300 is realized by way of a bore 102 in the oil-guiding diverting element 401 and/or by way of a guide rib system 103 on the internal wall 10 of the housing 03 in the region of the housing lower part 92.

Figure 6:
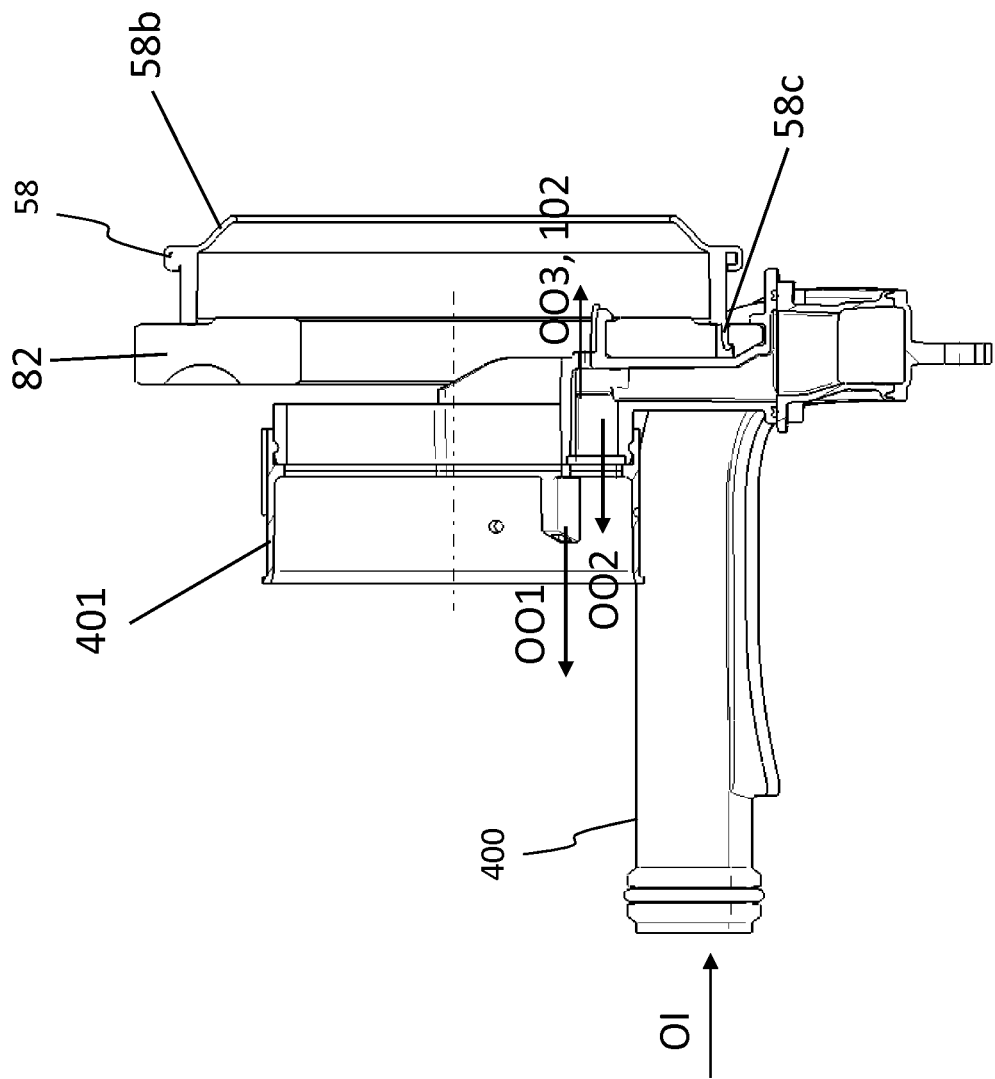
FIG. 6 illustrates a longitudinally sectioned detail view of an oil-guiding diverting element and of a connecting element.

The guide rib system 103 on the internal wall 10 of the housing 03 is formed by way of a recess in the housing. FIG. 6 illustrates the connecting element 58, which is fastened to a clutch element 82, and the oil-guiding diverting element 401. Oil from the intermediate oil reservoir 402 is supplied via the oil line 400 to the oil-guiding diverting element 401, and is conducted onward from there via oil guide ducts OO1, OO2, OO3. The first oil guide duct OO1 and the second oil guide duct OO2 guide oil from the oil-guiding diverting element 401 to the oil distributor 97. The third oil guide duct OO3 constitutes the bore 102 in the oil-guiding diverting element 401, and guides oil from the oil-guiding diverting element 401 to the third oil chamber 300.

The volumes of the oil chambers 100, 200, 300 situated above the oil level 90 are preferably dimensioned such that, with lubrication being ensured, the efficiency of the participating bearings 40, 50, 70, 80 is at a maximum.

The pump-free transfer gear 01 ensures, even in the event of deactivation of the offset gear 07 and thus of the secondary shaft 06, adequate lubrication of those bearings 40, 50, 70, 80 which continue to participate in the "disconnect" operating mode, without the need for a lubricant pump, as is conventional in the prior art.

The invention makes it possible to ensure the bearing service life in the event of deactivation of the offset gear 07, which is in the form of a chain drive, in the "disconnect" operating mode by way of encapsulation of the drive shaft bearing 40 and of the offset gear bearing 70. Furthermore, the oil chamber 300 of the primary shaft bearing 50 and of the clutch bearing 80 are connected by way of the additional connecting element 58, which effects sealing with respect to the housing 03.

In the transfer gear 01, the lubrication of all of the bearings 40, 50, 70, 80 which participate in the "disconnect" operating mode is ensured by way of specific oil reserves formed by three oil chambers 100, 200, 300, which in the "connect" operating mode of the transfer gear 01 are filled with oil lifted out of the oil sump 09. The oil reserves of the bearings 40, 50, 70, 80 are specially encapsulated and sealed off with respect to the housing 03, such that it can be ensured that the bearings 40, 50, 70, 80 can survive an operating duration corresponding to the consumption of one tank fill of a motor vehicle equipped with a transfer gear 01 of said type. The maximum fill level 101, 201, 301 of the individual oil reserve is in this case preferably set such that, with lubrication being ensured, maximum efficiency is realized.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE SIGNS

01 Transfer gear
02 Housing interior
03 Housing
04 Drive shaft
05 Primary shaft
06 Secondary shaft
07 Offset gear
08 Clutch
09 Oil sump
10 Internal wall (of the housing)
11 First assembly
12 Second assembly
13 Third assembly
14 Fourth assembly
15 Fifth assembly
40 Drive shaft bearing
44 Drive shaft sealing ring
45 Cover disc
46 Inner ring
47 Outer ring
48 Rolling element
50 Primary shaft bearing
51 Flange
52 Sealing ring
58 Connecting element
58a Annular element
58b Sealing lip
58c Detent tongue
60 Secondary shaft bearing
70 Offset gear bearing
74 Upper gearwheel (upper sprocket)
75 Lower gearwheel (lower sprocket)
76 Traction mechanism (chain)
77 Covering
78 Shoulder
80 Clutch bearing
81, 82 Clutch elements
90 Oil level
91 Housing cover
92 Housing lower part
93 First oil guiding rib
94 Opening (in the housing)
96 Second oil guiding rib
97 Oil distributor
98 Lubrication finger
99 Oil chamber
100 First oil chamber
101 Maximum fill level of the first oil chamber
102 Bore (in the oil-guiding diverting element)
103 Guide rib system (in the housing lower part)
200 Second oil chamber
201 Maximum fill level of the second oil chamber
300 Third oil chamber
301 Maximum fill level of the third oil chamber
400 Intermediate reservoir
401 Oil-guiding diverting element
OO1 First oil guide duct
OO2 Second oil guide duct
OO3 Third oil guide duct

What is claimed is:

1. A transfer gear having a housing which surrounds a housing interior and a plurality of assemblies each having at least one part, the transfer gear comprising:
   a first assembly including a drive shaft which is mounted so as to be rotatable in the housing and/or relative to the at least one part of at least one other of the plurality of assemblies by way of at least one drive shaft bearing;
   a second assembly including a primary shaft which is permanently coupled to the drive shaft and which is mounted so as to be rotatable in the housing and/or relative to the at least one part of at least one other of the plurality of assemblies by way of at least one primary shaft bearing;
   a third assembly including a secondary shaft which is arranged with an axial offset with respect to the drive shaft and which is mounted so as to be rotatable in the housing and/or relative to the at least one part of at least one other of the plurality of assemblies by way of at least one secondary shaft bearing;
   a fourth assembly including an offset gear which is arranged between the secondary shaft and the drive shaft and bridges the axial offset thereof and which has one or more offset gear elements which, by means of offset gear bearings, are mounted so as to be rotatable in the housing and/or relative to the at least one part of at least one other of the plurality of assemblies; and
   a fifth assembly including a clutch, wherein the clutch is arranged between the drive shaft and the offset gear and by means of said clutch the secondary shaft can be coupled to the drive shaft via the offset gear as required, the clutch having one or more clutch elements which are mounted so as to be rotatable in the housing and/or relative to the at least one part of the fifth assembly and/or at least one other of the plurality of assemblies by way of one or more clutch bearings,
   wherein the housing has an oil sump which occupies a low point of the housing interior and which has an oil level lying above the low point, wherein the offset gear extends at least partially to a level below the oil level and, during operation of the secondary shaft, conveys oil out of the oil sump to bearings situated above the oil level, wherein the bearings of the transfer gear are subdivided into bearings which participate exclusively in a "connect" operating mode of the transfer gear and bearings which continue to participate in a "disconnect" operating mode of the transfer gear,
   wherein the transfer gear has one or more oil chambers which are situated above the oil level and which are supplied with oil by way of the offset gear in the "connect" operating mode of the transfer gear and which communicate at least with those bearings which are arranged above the oil level and which continue to participate in the "disconnect" operating mode of the transfer gear, wherein an oil chamber has a respective maximum fill level, and multiple oil chambers have the same maximum fill level communicate with one another or are separated from one another.

2. The transfer gear in accordance with claim 1, wherein at least in each case one of the multiple oil chambers is associated with one bearing requiring an individual maximum fill level above the oil level, and/or is associated with one group of bearings requiring a common maximum fill level above the oil level.

3. The transfer gear in accordance with claim 1, wherein the one or more oil chambers includes at least one first oil chamber which is associated with the at least one drive shaft bearing.

4. The transfer gear in accordance with claim 3, wherein the first oil chamber is delimited by a drive shaft sealing ring arranged between the housing and the drive shaft and by a cover disc which is arranged unilaterally on a side of the drive shaft bearing which faces away from the sealing ring, wherein the height of which cover disc below the drive shaft predefines the maximum fill level of the first oil chamber and, wherein the cover disc prevents an oil volume enclosed between the drive shaft sealing ring and the cover disc up to the height of the cover disc below the drive shaft from flowing out to of the first oil chamber to the oil sump.

5. The transfer gear in accordance with claim 3, wherein a first oil-guiding rib protrudes from the housing into the housing interior and by means of which, in the "connect" operating mode, at least a part of the oil lifted out of the oil sump by way of the offset gear is guided to the first oil chamber.

6. The transfer gear in accordance with claim 3, wherein the one or more oil chambers also includes at least one second oil chamber which is associated with the at least one offset gear bearing.

7. The transfer gear in accordance with claim 6, wherein the second oil chamber is delimited by an at least unilateral covering of the at least one offset gear bearing.

8. The transfer gear in accordance with claim 7, wherein the second oil chamber is delimited, on a side of the at least one offset gear bearing which faces away from the covering, by a shoulder in a central opening, which surrounds an outer circumference of the at least one offset gear bearing, of the offset gear element which is rotatably mounted by means of the at least one offset gear bearing.

9. The transfer gear in accordance with claim 8, wherein the offset gear element of the offset gear is a sprocket which is rotatably mounted on the drive shaft by way of the at least one offset gear bearing and which is an upper sprocket in relation to the oil level, wherein the offset gear further comprises a lower sprocket which at least partially splashes in the oil sump, and a chain which is looped around the lower sprocket and the upper sprocket and which likewise at least partially splashes in the oil sump.

10. The transfer gear in accordance with claim 6, wherein the one or more oil chambers also includes at least one third oil chamber which is associated with at least one primary shaft bearing and/or the at least one clutch bearing.

11. The transfer gear in accordance with claim 10, wherein the third oil chamber connects the lubrication of the at least one primary shaft bearing to the lubrication of the at least one clutch bearing by way of a connecting element which comprises an axial seal with respect to the housing such that the third oil chamber communicates with the at least one primary shaft bearing and with the at least one clutch bearing, and wherein the third oil chamber is delimited at one side by an edge in the housing and/or a flange of the primary shaft and/or by a sealing ring arranged between the housing and the primary shaft and at the other side by a clutch bearing which is remote from the edge in the housing and/or from the flange of the primary shaft and/or from the sealing ring arranged between the housing and the primary shaft.

12. The transfer gear in accordance with claim 11, wherein the maximum fill level of the third oil chamber is defined for the at least one primary shaft bearing by way of the edge in the housing and for the at least one clutch bearing by means of a radially inner edge of the clutch element, which is supported by way of the at least one clutch bearing so as to be rotatable relative to the housing and/or the drive shaft and/or the primary shaft.

13. The transfer gear in accordance with claim 10, wherein a oil-guiding rib projects from the housing into the housing interior and by means of which, in the "connect" operating mode, at least a part of the oil lifted out of the oil sump by means of the offset gear is conducted to an intermediate oil reservoir.

14. The transfer gear in accordance with claim 13, wherein the intermediate oil reservoir is fluidically connected via an oil line to an oil-guiding diverting element.

15. The transfer gear in accordance with claim 14, wherein the oil-guiding diverting element is fluidically connected via a first oil guide duct and a second oil guide duct to an oil distributor, and wherein the at least one second oil chamber is supplied with oil by way of the oil distributor.

16. The transfer gear in accordance with claim 14, wherein the oil-guiding diverting element is fluidically connected via a third oil guide duct to the third oil chamber, such that the at least one third oil chamber is supplied with oil by way of the oil-guiding diverting element.

17. A transfer gear comprising:
a housing defining a housing interior;
a first shaft rotatably mounted in the housing by way of a first shaft bearing;
a second shaft arranged axially offset relative to the first shaft and which is rotatably mounted in the housing by way of a second shaft bearing for rotation relative to the first shaft;
an offset gear having a first offset gear element rotatably mounted to the first shaft by way of an offset gear bearing for rotation relative to the first shaft, a second offset gear element fixed for rotation with the second shaft, and a third offset gear element drivingly connecting the first offset gear element for rotation with the second offset gear element; and
a clutch arranged between the first shaft and the first offset gear element and operable to selectively couple the second shaft to the first shaft via the offset gear, the clutch having a clutch element rotatably mounted via a clutch bearing;
wherein the housing includes an oil sump of oil located at a low point of the housing interior and which has an oil level lying above the low point, wherein the second offset gear element extends at least partially into the oil sump to a level below the oil level such that during rotation of the second shaft oil is conveyed from the oil sump to the first shaft bearing, the offset gear bearing and the clutch bearing, all being situated above the oil level, wherein the second shaft bearing participates exclusively in a "connect" operating mode of the transfer gear and the remaining bearings each continue to participate in a "disconnect" operating mode of the transfer gear,
wherein the transfer gear has first, second and third oil chambers situated above the oil level and which are supplied with oil by way of the offset gear being rotated with the second shaft in the "connect" operating mode of the transfer gear, wherein the first oil chamber communicates with the first shaft bearing, the second oil chamber communicates with the offset gear bearing and the third oil chamber communicates with the clutch bearing and which continue to participate in the "disconnect" operating mode of the transfer gear, wherein each of the first, second and third oil chambers have a respective maximum oil fill level that is maintained during the "disconnect" operating mode of the transfer gear.

18. The transfer gear in accordance with claim 17, wherein the first oil chamber is delimited by a first shaft sealing ring arranged between the housing and the first shaft and by a cover disc which is arranged unilaterally on a side of the first shaft bearing which faces away from the sealing ring, wherein the height of which cover disc below the first shaft predefines the maximum fill level of the first oil chamber and, wherein the cover disc prevents an oil volume enclosed between the first shaft sealing ring and the cover disc up to the height of the cover disc below the first shaft from flowing out to of the first oil chamber to the oil sump.

19. The transfer gear in accordance with claim 18, wherein a first oil-guiding rib protrudes from the housing into the housing interior and by means of which, in the "connect" operating mode, at least a part of the oil lifted out of the oil sump by way of the offset gear is guided to the first oil chamber.

20. The transfer gear in accordance with claim 17, wherein the second oil chamber is delimited, on a side of the offset gear bearing which faces away from the covering, by a shoulder in a central opening, which surrounds an outer circumference of the offset gear bearing, of the first offset gear element which is rotatably mounted by means of the offset gear bearing.

21. The transfer gear in accordance with claim 10, wherein the third oil chamber connects the lubrication of the first shaft bearing to the lubrication of the clutch bearing by way of a connecting element which comprises an axial seal with respect to the housing such that the third oil chamber communicates with the first shaft bearing and with the clutch bearing, and wherein the third oil chamber is delimited at one side by an edge in the housing and/or a flange of the first shaft and/or by a sealing ring arranged between the housing and the first shaft and at the other side by a second clutch bearing which is remote from the edge in the housing and/or from the flange of the first shaft and/or from the sealing ring arranged between the housing and the first shaft.

* * * * *